(12) United States Patent
Ke

(10) Patent No.: US 7,990,625 B2
(45) Date of Patent: Aug. 2, 2011

(54) CAMERA MODULE

(75) Inventor: Chau-Yuan Ke, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 231 days.

(21) Appl. No.: 12/351,986

(22) Filed: Jan. 12, 2009

(65) Prior Publication Data

US 2009/0268309 A1   Oct. 29, 2009

(30) Foreign Application Priority Data

Apr. 25, 2008 (CN) .......................... 2008 1 0301319

(51) Int. Cl.
*G02B 15/14* (2006.01)
(52) U.S. Cl. ...................................................... 359/696
(58) Field of Classification Search ................... 359/696
See application file for complete search history.

(56) References Cited

U.S. PATENT DOCUMENTS

| | | | |
|---|---|---|---|
| 2004/0174614 A1* | 9/2004 | Hovanky | 359/694 |
| 2005/0146637 A1* | 7/2005 | Kawauchi | 348/363 |
| 2007/0047942 A1* | 3/2007 | Chang et al. | 396/133 |

\* cited by examiner

*Primary Examiner* — Ricky L Mack
*Assistant Examiner* — Vipin M Patel
(74) *Attorney, Agent, or Firm* — Clifford O. Chi

(57) ABSTRACT

A camera module includes a zoom lens group, a focus lens group, a barrel, an actuator group comprising a first actuator and a second actuator. The first and second actuators are received in the barrel, and respectively receive the zoom lens group and the focus lens group therein. The first lens group is driven by the first actuator to move along the axis thereof. The second lens group is driven by the second actuator to move along the axis thereof.

18 Claims, 4 Drawing Sheets

CAMERA MODULE

BACKGROUND

1. Technical Field

The present disclosure relates to camera modules, and particularly to a camera module with a simple and compact zoom and auto-focus mechanism.

2. Description of Related Art

In recent years, camera modules have been incorporated into mobile devices, such as mobile phones and laptop computers. Most of these devices are progressively becoming smaller over time, and digital camera modules are, experiencing a corresponding reduction in size. Nevertheless, in spite of the small size of current digital camera modules, there remains a high demand for useful properties of the camera modules, such as zoom function or auto-focus function.

Generally, the camera module usually includes an actuator, such as a stepping motor, to drive the lenses to achieving zoom function or auto-focus function. However, the step motor is relatively large in volume. Use of the step motor requires a significant amount of space for movement of the lenses, which makes the camera module bulky.

Therefore, what is needed is a camera module which has a simple and compact zoom and auto-focus mechanism.

Other advantages and novel features of the present invention will become more apparent from the following detailed description of preferred embodiment when taken in conjunction with the accompanying drawings.

BRIEF DESCRIPTION OF THE DRAWINGS

Many aspects of the camera module can be better understood with reference to the following drawings. The components in the drawing are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE EMBODIMENTS

Figure 1:
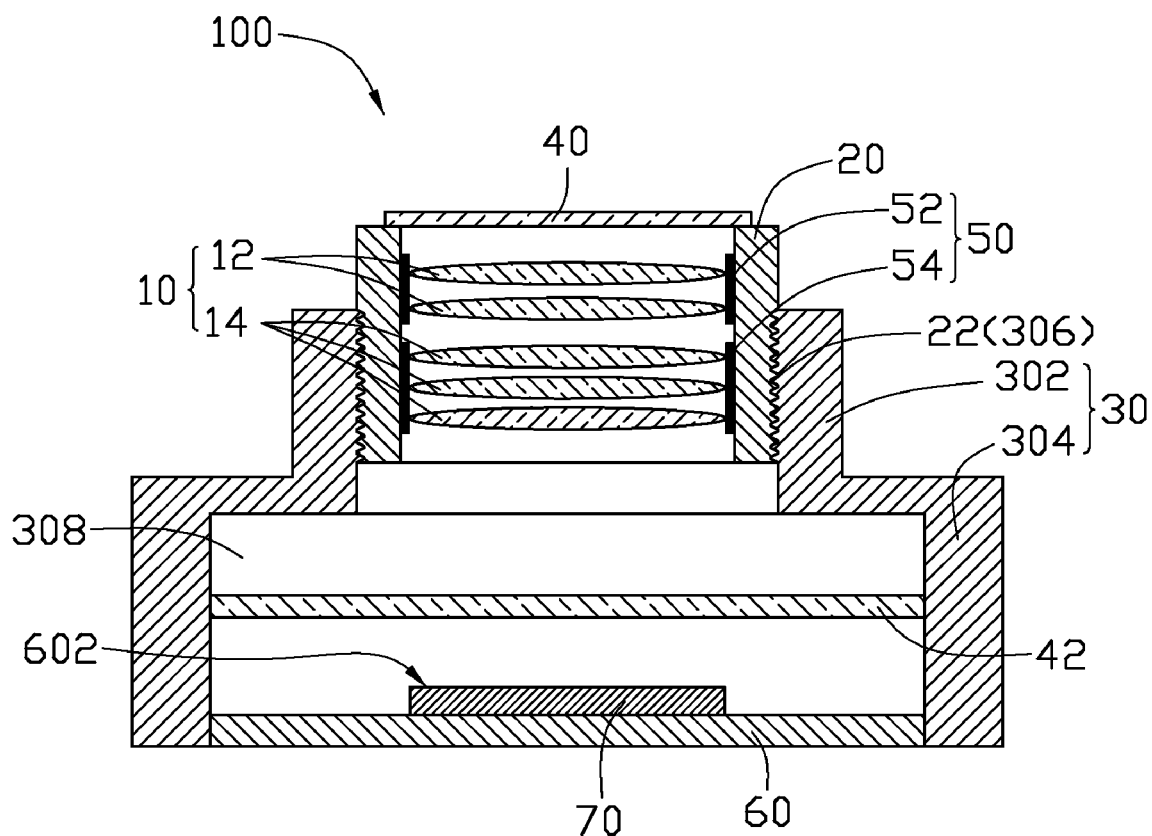
FIG. 1 is a cross-section of a camera module according to a first embodiment, the camera module including a first actuator and a second actuator.

Referring to FIG. 1, a camera module 100, in accordance with an exemplary embodiment, includes a lens group 10, a barrel 20, a holder 30, two transparent cover plates 40, 42, a actuator group 50, a image sensor 60 having a sensing surface 602, and a circuit board 70.

The lens group 10 includes a zoom lens group 12 having two lenses, and a focus lens group 14 having three lenses. The focus lens group 14 is optically aligned with the zoom lens group 12, and is configured for focusing an image on the sensing surface 602 of the image sensor 60.

The barrel 20 has outer threads 22 formed thereon. Preferably, the transparent cover plate 40 is arranged on the top end of the barrel 20 for preventing impurity entering the barrel 20.

The holder 30 includes a top portion 302 and a bottom portion 304. The top portion 302 is a hollow cylinder, and has inner threads 306 formed therein corresponding to the outer threads 22 of the barrel 20. Then the top portion 302 is threadedly engaged with the barrel 20. The bottom portion 304 defines a cavity 308 in communication with the top portion 302 to make light passing through the barrel 20 enter the bottom portion 304. The image sensor 60 is received in the bottom portion 304.

The actuator group 50 includes a first actuator 52 and a second actuator 54. The first actuator 52 and the second actuator 54 respectively accommodate the zoom lens group 12 and the focus lens group 14 therein. The first actuator 52 and the second actuator 54 are respectively configured for driving the zoom lens group 12 and the focus lens group 14 to move along the optical axis (not shown) thereof. The first actuator 52 and the second actuator 54 are mounted in the barrel 20 by adhesive. In this embodiment, the first actuator 52 and the second actuator 54 are voice coil motors.

Figure 2:
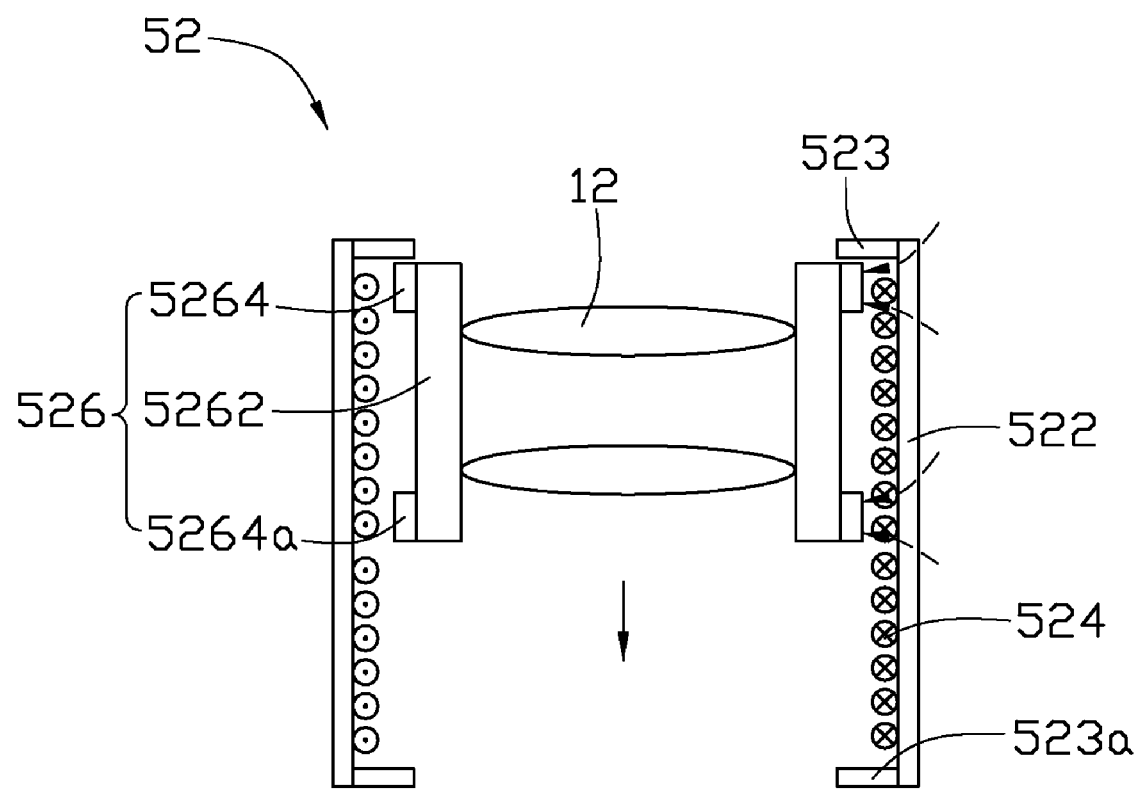
FIG. 2 is a cross-section of the first actuator in the FIG. 1.

Referring to FIG. 2, The first actuator 52 includes a hollow cylindrical main body 522, two paramagnetic or ferromagnetic end portions (523, 523a) arranged at opposite sides of the main body 522, a first coil 524 attached around an inner wall of the main body 522, and a magnetic barrel 526 movably received in the first coil 524 and accommodating the zoom lens group 12 therein. The paramagnetic or ferromagnetic end portions (523, 523a) extend inwardly from the opposite sides of the main body 522, respectively. Each of the paramagnetic or ferromagnetic end portions (523, 523a) is configured for magnetically attracting the magnetic barrel 526 thereto. In this embodiment, the end portions (523, 523a) are annular shaped, and is comprised of iron. The outer walls of the end portions (523, 523a) are respectively glued (i.e., adhesively mounted) to the inner wall of the main body 522, and are coaxial to each other.

The magnetic barrel 526 comprises a hollow cylindrical non-magnetic body 5262 and two annular magnets (5264, 5264a) attached to opposite ends thereof, respectively. In this embodiment, the non-magnetic body 5262 is made of plastic, and the two annular magnets (5264, 5264a) are comprised of a permanent magnetic material.

In this embodiment, the body 5262 is made of plastic. The magnet 5264 has the same structure of the magnet 5264a. The inner walls of the annular magnets (5264, 5264a) are glued to the outer wall of the magnetic barrel 526, and are coaxial to each other.

When there is no current applied to the first coil 524, one of the end portions (523, 523a) is configured for attracting one of the annular magnets (5264, 5264a). When an electric current is applied to the first coil 524, the first coil 524 are excited to act upon the annular magnets (5264, 5264a), thereby driving the zoom lens group 12 to move along the optical axis thereof (not shown) for changing the focus of the lens group 10.

In this embodiment, the outer side of the first magnet 5264 is S pole. When an electric current (showed in FIG. 2) is applied to the first coil 524, the body 5262 moves toward to the end portion 523a, and is attracted by the end portion 523a for adjusting the focus of the lens group 10. Of course, the outer side of the first magnet 5264 may be N pole.

Figure 3:
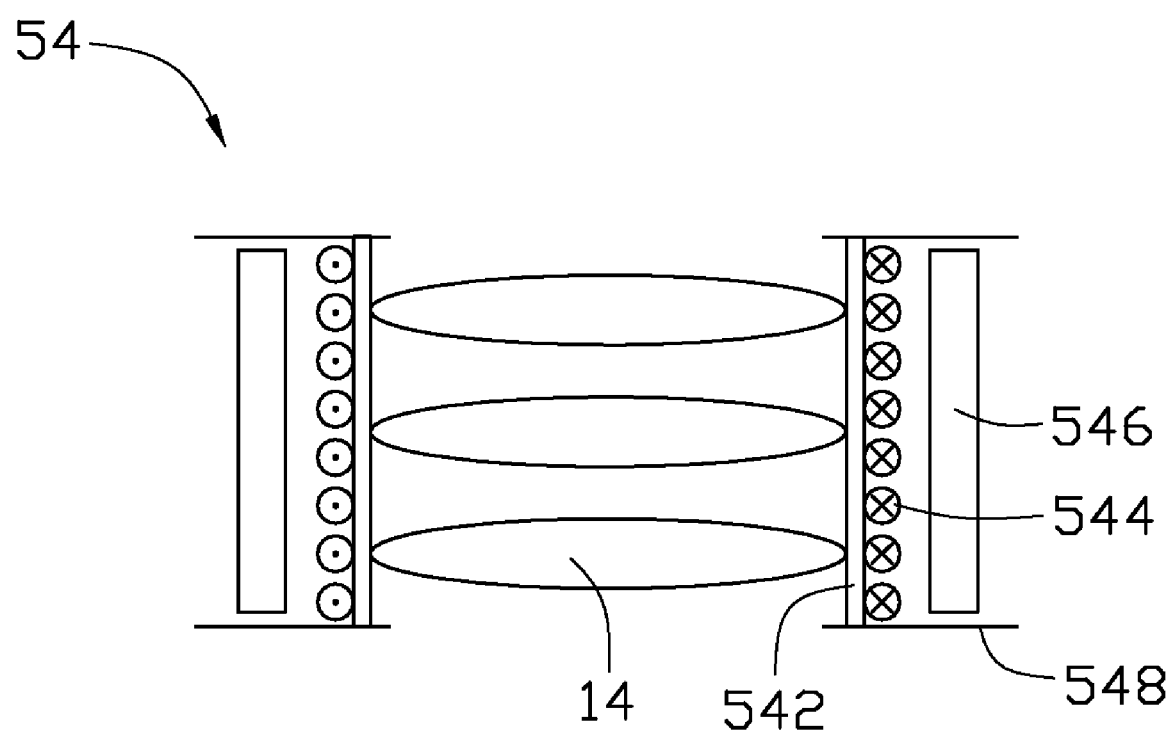
FIG. 3 is a cross-section of the second actuator in the FIG. 1.

Referring to FIG. 3, the second actuator 54 includes a movable barrel 542 receiving the focus lens group 14 therein, a second coil 544 coiled around the outer wall of the movable barrel 542, a annular magnet 546 surrounding the movable barrel 542, and a pair of flat spring plates 548 respectively fixed on the opposite ends of the second movable barrel 542. In this embodiment, the outer wall of the annular magnet 546 is glued to the inner wall of the movable barrel 542. Because the second actuator 54 has flat spring plates 548 respectively fixed on the opposite ends of the movable barrel 542, the second actuator 54 only makes the focus lens group 14 move a litter distance. So, the second actuator 54 is configured for being an auto-focus mechanism.

When an electric current is applied to the second coils 544, the second coils 544 are excited to act upon the annular magnet 546, thereby driving the focus lens group 14 to move along the optical axis thereof (not shown) for auto-focusing. When electric current is cut off, the flat spring plates 548 impart a restoring force to the movable barrel 542, thereby returning the movable barrel 542 to its former position.

Referring to FIG. 1 again, the image sensor 60 is a charge coupled device (CCD) or a complementary metal oxide semiconductor transistor (CMOS). The image sensor 60 is mounted on the circuit board 70, and is electrically connected to the circuit board 70. Preferably, a transparent cover plate 42 is arranged above the image sensor 60 for preventing the image sensor 60 from dust pollution.

The first and second actuators (52, 54) are smaller and simpler, and respectively drive the zoom and focus lens groups (12, 14) for zooming function and auto-focusing function, respectively. So, the camera module 100 has a simple and compact zoom and auto-focus mechanism.

Figure 4:
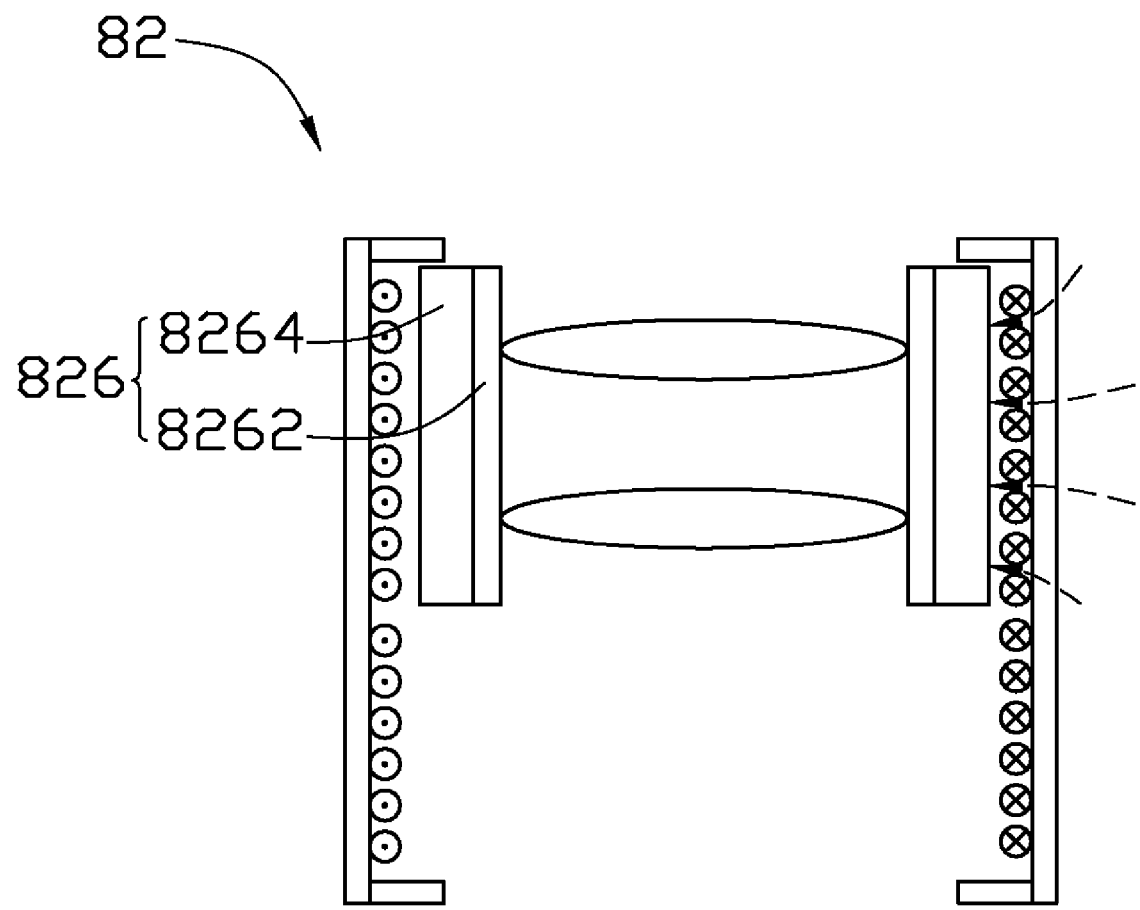
FIG. 4 is a cross-section of the first actuator according to a second embodiment.

Referring to FIG. 4, a first actuator 82, in accordance with a second embodiment, is similar to the first actuator 52, except that the magnetic barrel 826 includes a hollow cylindrical plastic barrel 8262, and a hollow cylindrical magnet 8264 coaxially attached to the plastic barrel 8262. The magnet 8264 is comprised of a permanent magnetic material. The inner wall of the magnet 8264 is glued to the outer wall of the plastic barrel 8262. Alternatively, the plastic barrel 8262 can be omitted. In that case, the lens can be directly mounted in the cylindrical magnet 8264.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A camera module, comprising:
   a zoom lens group;
   a focus lens group optically aligned with the zoom lens; a barrel, and an actuator group comprising a first actuator and a second actuator, the first and second actuators being received in the barrel, and respectively receiving the zoom lens group and the focus lens group therein, wherein the first actuator comprises a hollow cylindrical main body, two paramagnetic or ferromagnetic end portions arranged at opposite inside edges of the main body, a coil attached around an inner wall of the main body and being substantially parallel to an optical axis of the main body, a magnetic barrel movably received in the coil and accommodating the zoom lens group therein, the paramagnetic or ferromagnetic end portions extend inwardly from the opposite inside edges of the main body, respectively, each of the paramagnetic or ferromagnetic end portions configured for magnetically attracting the magnetic barrel thereto, the zoom lens group is driven by the first actuator to move along the axis thereof, the focus lens group is driven by the second actuator to move along the axis thereof.

2. The camera module as claimed in claim 1, wherein the magnetic barrel comprises a hollow cylindrical non-magnetic body, and a hollow cylindrical magnet coaxially attached to the non-magnetic body, and the inner wall of the magnet is fixed on the outer wall of the non-magnetic body.

3. The camera module as claimed in claim 2, wherein the second actuator includes a movable barrel receiving the focus lens group therein, a coil coiled around the outer wall of the movable barrel, a annular magnet fixed on the inner wall of the barrel, and a pair of flat spring plates respectively fixed on the opposite ends of the movable barrel.

4. The camera module as claimed in claim 3, further comprising a transparent cover plate arranged on the top end of the barrel.

5. A camera module comprising:
   an image sensor having a sensing surface; a zoom lens group positionable to a plurality of discrete positions thereby providing a variable focal length;
   a focus lens group optically aligned with the zoom lens, for focusing an image on the sensing surface of the image sensor;
   a first actuator for driving the zoom lens to move to a selected position of the discrete positions, the first actuator comprising an inner cylindrical body receiving the zoom lens group therein, an outer cylindrical body, a plurality of positioning portions arranged at discrete positions at opposite inside edges of the outer cylindrical body for magnetically attracting the inner cylindrical body thereto thereby positioning the zoom lens group to the discrete positions, a coil attached around an inner wall in the outer cylindrical body and being substantially parallel to an optical axis of the outer cylindrical body for magnetically moving the inner cylindrical body along an optical axis of the zoom lens, the positioning portions being comprised of a paramagnetic material or a ferromagnetic material; and
   a second actuator for continuously moving the focus lens group to focus the image on the sensing surface of the image sensor.

6. The camera module as claimed in claim 5, wherein the inner cylindrical body is comprised of a permanent magnetic material.

7. The camera module as claimed in claim 6, wherein the inner cylindrical body comprises a hollow cylindrical non-magnetic body, and two magnets attached to opposite ends thereof, respectively.

8. The camera module as claimed in claim 7, wherein the second actuator is a voice coil motor.

9. The camera module as claimed in claim 8, wherein the second actuator includes a movable barrel receiving the focus lens group therein, a coil coiled around the outer wall of the movable barrel, an annular magnet surrounding the movable barrel, and a pair of flat spring plates respectively fixed on the opposite ends of the movable barrel.

10. The camera module as claimed in claim 6, wherein the inner cylindrical body comprises a hollow cylindrical non-magnetic body, and a hollow cylindrical magnet coaxially attached to the non-magnetic body, and the inner wall of the magnet is fixed on the outer wall of the non-magnetic body.

11. The camera module as claimed in claim 10, wherein the second actuator is a voice coil motor.

12. The camera module as claimed in claim 11, wherein the second actuator includes a movable barrel receiving the focus lens group therein, a coil coiled around the outer wall of the movable barrel, an annular magnet surrounding the movable barrel, and a pair of flat spring plates respectively fixed on the opposite ends of the movable barrel.

13. A camera module, comprising: a zoom lens group; a focus lens group optically aligned with the zoom lens; a barrel, and an actuator group comprising a first actuator and a second actuator, the first and second actuators being received in the barrel, and respectively receiving the zoom lens group and the focus lens group therein, wherein the zoom lens group is driven by the first actuator to move along an axis thereof, the focus lens group is driven by the second actuator to move along the axis thereof, the first actuator comprises a hollow cylindrical main body, two paramagnetic or ferromagnetic end portions arranged at opposite inside edges of the main body, a coil attached around an inner wall of the main body and being substantially parallel to an optical axis of the main body, a magnetic barrel movably received in the coil and accommodating the zoom lens group therein, the magnetic barrel comprises a hollow cylindrical non-magnetic body, and a hollow cylindrical magnet coaxially attached to the non-magnetic body, and the inner wall of the magnet is fixed on the outer wall of the non-magnetic body.

14. The camera module as claimed in claim 13, wherein the paramagnetic or ferromagnetic end portions extend inwardly from the opposite sides of the main body, respectively, each of the paramagnetic or ferromagnetic end portions configured for magnetically attracting the magnetic barrel thereto.

15. The camera module as claimed in claim 14, wherein the paramagnetic or ferromagnetic end portions are respectively glued to the inner wall of the hollow cylindrical main body, and are coaxial to each other.

16. The camera module as claimed in claim 15, wherein the second actuator is a voice coil motor.

17. The camera module as claimed in claim 16, wherein the second actuator includes a movable barrel receiving the focus lens group therein, a coil coiled around the outer wall of the movable barrel, a annular magnet fixed on the inner wall of the barrel, and a pair of flat spring plates respectively fixed on the opposite ends of the movable barrel.

18. The camera module as claimed in claim 17, further comprising a transparent cover plate arranged on the top end of the barrel.

* * * * *